United States Patent

Blakley et al.

(10) Patent No.: US 9,971,114 B2
(45) Date of Patent: May 15, 2018

(54) OPTICAL CABLE CONTAINING FIBER BUNDLES AND THREAD FOR TYING THE BUNDLES

(71) Applicant: OFS Fitel, LLC, Norcross, GA (US)

(72) Inventors: Robert J Blakley, Bristol, CT (US); Daniel Hendrickson, Roswell, GA (US); Michael A Morra, Cumming, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days. days.

(21) Appl. No.: 14/940,449

(22) Filed: Nov. 13, 2015

(65) Prior Publication Data

US 2017/0139166 A1    May 18, 2017

(51) Int. Cl.
*G02B 6/44* (2006.01)
*B05D 1/26* (2006.01)
(Continued)

(52) U.S. Cl.
CPC ............... *G02B 6/441* (2013.01); *B05D 1/18* (2013.01); *B05D 1/265* (2013.01); *B05D 1/30* (2013.01); *B29D 11/00673* (2013.01); *D02G 3/36* (2013.01); *D02G 3/404* (2013.01); *G02B 6/443* (2013.01); *G02B 6/4439* (2013.01);
(Continued)

(58) Field of Classification Search
CPC .... G02B 6/441; G02B 6/4479; G02B 6/4439; G02B 6/4494; G02B 6/443; G02B 6/4413
See application file for complete search history.

(56) References Cited

U.S. PATENT DOCUMENTS

| 4,867,526 | A |   | 9/1989 | Arroyo |           |
|-----------|---|---|--------|--------|-----------|
| 6,103,317 | A | * | 8/2000 | Asai   | G02B 6/4494 |
|           |   |   |        |        | 106/14.05 |

(Continued)

FOREIGN PATENT DOCUMENTS

| EP | 1 310 814 A1  |   | 5/2003  |           |
|----|---------------|---|---------|-----------|
| JP | 02277842 A    | * | 11/1990 | D06M 15/00 |
| JP | 2012 212097 A |   | 11/2012 |           |

OTHER PUBLICATIONS

Sumitomo Seika Chemicals Co., Ltd., Super Absorbent Aqua Keep (brochure 2014).

(Continued)

*Primary Examiner* — Ryan Lepisto
*Assistant Examiner* — Erin Chiem
(74) *Attorney, Agent, or Firm* — Leo Zucker, Esq.

(57) ABSTRACT

A thread for tying a group of fibers in a fiber optic cable having an outer jacket to one another to form a fiber bundle. The thread includes a length of a binder thread, and an adhesion material coated on the binder thread so that (a) the binder thread adheres to the group of optical fibers about which the thread is tied to form the fiber bundle, and the binder thread remains adhered to the bundled fibers to restrain movement of the fibers when the outer jacket and cable elements other than the bundled fibers are removed. After the binder thread is tied about a fiber bundle, exposed surfaces of the adhesion material coated on the binder thread are treated so that the thread does not adhere to any cable elements in proximity to the thread, other than the fibers of the bundle about which the thread is tied.

10 Claims, 2 Drawing Sheets

(51) Int. Cl.
  *B05D 1/30* (2006.01)
  *B29D 11/00* (2006.01)
  *B05D 1/18* (2006.01)
  *D02G 3/40* (2006.01)
  *D02G 3/36* (2006.01)

(52) U.S. Cl.
  CPC ......... *G02B 6/4479* (2013.01); *G02B 6/4494* (2013.01); *G02B 6/4413* (2013.01)

(56) References Cited

U.S. PATENT DOCUMENTS

| | | | | |
|---|---|---|---|---|
| 6,316,554 | B1* | 11/2001 | Fridman | A61L 15/60 526/271 |
| 6,807,347 | B2 | 10/2004 | McAlpine et al. | |
| 7,135,135 | B2* | 11/2006 | Anderson | A61F 13/534 264/173.16 |
| 2007/0207186 | A1* | 9/2007 | Scanlon | A61F 2/07 424/424 |
| 2008/0199663 | A1* | 8/2008 | Burmeister | B29C 43/222 428/195.1 |
| 2013/0287346 | A1* | 10/2013 | Gimblet | G02B 6/4495 385/100 |
| 2015/0013874 | A1* | 1/2015 | Siebert | H01B 13/0129 156/52 |

OTHER PUBLICATIONS

European Patent Office, Extended Search Report, Appl'n No. EP 16 179 549.7 (dated Mar. 20, 2017).

Barnet, Industrial Yarns—Textile Filaments, Online Brochure—5 pages (Jul. 2013).

* cited by examiner

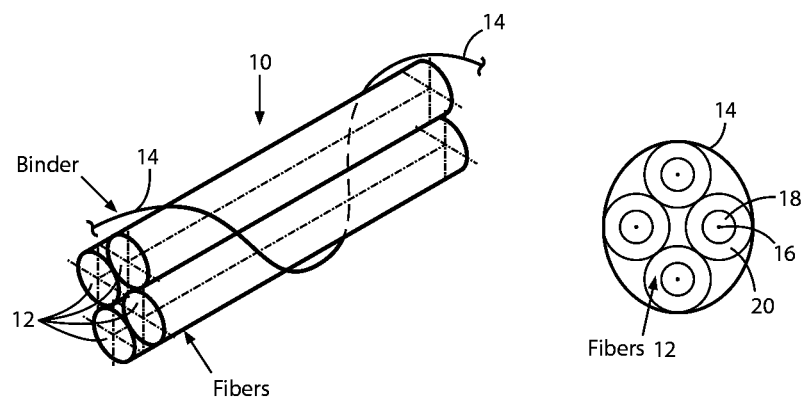
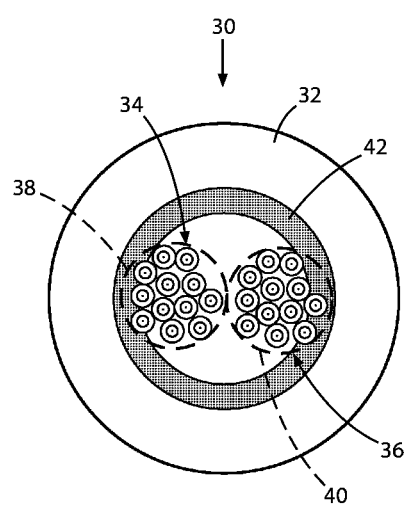
Example Cable with 2 groups of 12 fibers
Each Group Held with a binder
FIG. 3

OPTICAL CABLE CONTAINING FIBER BUNDLES AND THREAD FOR TYING THE BUNDLES

BACKGROUND OF THE INVENTION

Field of the Invention

The present invention relates to communication cables, particularly optical cables that contain bundles of optical fibers.

Discussion of the Known Art

U.S. Pat. No. 6,807,347 (Oct. 19, 2004) discloses a high density fiber optic cable in which groups of fibers are each harnessed or bound by a binder thread to form a number of fiber bundles. All relevant portions of the '347 patent are incorporated by reference.

When installing a cable that contains bundles of optical fibers, and each bundle is tied with a binder thread as in the referenced '347 patent, the following problems arise when the cable jacket is stripped or removed from one end of the cable in order to terminate or splice the exposed fibers.

1. In the absence of the cable jacket that surrounds the fiber bundles, the binder threads loosen or separate from the associated fiber bundles and fail to restrain the fibers of each bundle from moving about freely. As a result, fibers originating from different bundles will often tend to align and commingle with one another, making it difficult for an installer to determine to which bundle a given fiber may belong. The installer must therefore use special care and take additional time when stripping the cable jacket to access the bundled fibers.

2. To preserve the integrity of each of the fiber bundles, the installer often strips off a relatively long piece of the cable jacket so that the binder threads will remain physically tied around at least some portions of the exposed bundles. All the long pieces of the stripped cable jacketing create excess scrap, and scrap reduction is essential if the costs associated with cable installations are to be controlled.

FIG. 1 illustrates a fiber bundle 10 including a group of four fibers 12 encircled by a binder thread 14 as in the prior art. FIG. 2 is a cross sectional view or profile of the fiber bundle 10 in FIG. 1. Each fiber has a central core 16, a cladding layer 18 that surrounds the core 16, and an outer coating layer 20 typically formed of UV curable acrylate that surrounds the cladding layer 18. The fibers 12 can have any one of a number of different outer diameters, for example and without limitation, 250 µm or 200 µm which are common diameters.

FIG. 3 is a cross sectional view through a fiber optic cable 30 having an outer jacket 32 and which contains two fiber bundles 34, 36. Each bundle includes, for example, 12 fibers that are encircled by a corresponding binder thread 38, 40 as in the prior cables. A layer of strength elements 42 (e.g., aramid yarn) is interposed between the fiber bundles 34, 36 and the outer jacket 32 of the cable 30.

FIG. 4 shows one end of the cable 30 in FIG. 3, after a length of the outer jacket 32 and the strength elements 42 are removed to expose the fiber bundles 34, 36. The binder threads 38, 40 that encircle and restrain the bundled fibers beneath the jacket 32, become loose and easily separate from the associated bundles. As a result, the threads 38, 40 no longer adequately restrain the fibers from movement. Fibers from both of the fiber bundles 34, 36 will then tend to align and commingle with one another as shown in FIG. 4, where an unrestrained fiber 34a from bundle 34 becomes mixed among the fibers from bundle 36, and an unrestrained fiber 36a from bundle 36 becomes mixed among the fibers from bundle 34.

Accordingly, there is a need for a fiber optic cable of the kind that contains a number of fiber bundles, wherein each bundle is tied by a binder thread that remains in place and continues to restrain movement of the bundled fibers after the cable jacket and other cable elements in proximity to the bundles are removed.

SUMMARY OF THE INVENTION

According to the invention, a thread for tying a group of optical fibers in a fiber optic cable having an outer jacket to one another to form a fiber bundle, includes a length of a binder thread, and an adhesion material coated on the thread. The adhesion material is formulated so that (a) the binder thread adheres to the group of optical fibers about which the thread is tied to form a fiber bundle, and (b) the binder thread remains adhered to the fiber bundle to restrain movement of the optical fibers in the bundle when the outer jacket and any cable elements in proximity to the binder thread are removed.

According to another aspect of the invention, a method of producing a thread for tying a group of fibers in a fiber optic cable having an outer jacket to one another, includes providing a length of a binder thread, and coating the thread with an adhesion material. The adhesion material is formulated so that when coated on the binder thread, (a) the binder thread adheres to the group of optical fibers about which the thread is tied to form a fiber bundle, and (b) the binder thread remains adhered on the fiber bundle to restrain movement of the optical fibers in the bundle when the outer jacket and any cable elements in proximity to the binder thread are removed.

According to another aspect of the invention, an optical cable has an outer jacket, and two or more bundles of optical fibers surrounded by the outer jacket. Each bundle includes a group of optical fibers, and a thread tied about the fibers to form the bundle. The thread includes a length of a binder thread, and an adhesion material coated on the binder thread. The adhesion material is formulated so that when coated on the binder thread, (a) the thread adheres to the optical fibers about which the thread is tied to form a fiber bundle, and (b) the thread remains adhered on the fiber bundle to restrain the optical fibers of the bundle from aligning and commingling among fibers of another bundle when the outer jacket and any cable elements in proximity to the binder thread are removed.

For a better understanding of the invention, reference is made to the following description taken in conjunction with the accompanying drawing and the appended claims.

BRIEF DESCRIPTION OF THE DRAWING FIGURES

In the drawing:

FIG. 1 is a view of a bundle of four fibers encircled by a binder thread as in the prior art;

FIG. 2 is a cross sectional view through the fiber bundle in FIG. 1;

FIG. 3 is a cross sectional view through a fiber optic cable containing two fiber bundles, each of which is tied with a binder thread as in the prior art;

DETAILED DESCRIPTION OF THE INVENTION

Figure 4:
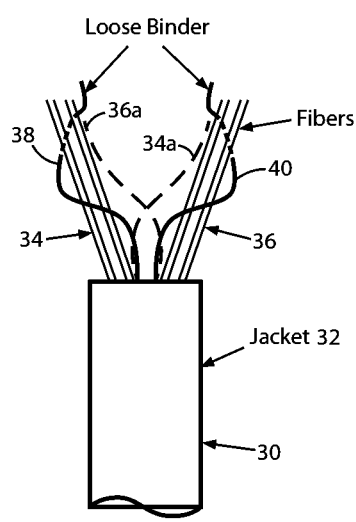
FIG. 4 is a view of one end of the cable in FIG. 3 after an outer jacket is stripped to expose the fiber bundles.
Figure 5:
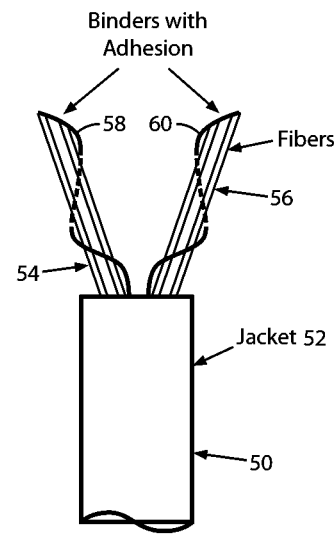
FIG. 5 is a view of one end of a fiber optic cable containing two fiber bundles, each of which is tied with a binder thread according to the invention.

FIG. 5 illustrates one end of a fiber optic cable 50 after a length of a cable jacket 52 is stripped away to expose two fiber bundles 54, 56. Other cable elements that may be disposed between the fiber bundles 54, 56 and the jacket 52 (e.g., strength elements 42 in FIG. 3) are also removed from the end of the cable 50. The fiber bundles 54, 56 are encircled and tied with corresponding binder threads 58, 60, according to the invention. Each binder thread is tied about its associated fiber bundle in a helical manner with a pitch of between, for example, 20 mm and 300 mm, and preferably about 75 mm. Each binder thread may also be formed by a looper thread and a separate needle thread, one of which passes alternately back and forth over an upper portion of the associated fiber bundle while the other thread passes alternately back and forth under a lower portion of the bundle, so that the overall thread has a zig-zag appearance over the length of the bundle. See U.S. Pat. No. 6,807,347 (Oct. 19, 2004) which is incorporated by reference.

The inventive binder threads 58, 60 may be multifilament, monofilament, round, spun, or in the form of a flat tape. A preferred material for the threads is polyester since it is relatively low cost and is resistant to fungus. For example, each thread may be comprised of a polyester filament with a yield of, e.g., from about 410 dTex to about 1650 dTex. Alternatively, the threads 58, 60 can be formed of other materials including, for example, polyaramid, polypropylene, polyethylene, polyvinyl alcohol, liquid crystal polymers, and nylon Unlike existing binder threads that have a silicone wax or other finish which is inert to the surfaces of the optical fibers that the threads encircle, the inventive threads 58, 60 are initially coated with an adhesion material that acts to bond the threads to the associated fiber bundles 54, 56, and to keep the threads in place when the bundles are exposed. That is, when the cable jacket 52 and any other cable elements adjacent the binder threads 58, 60 are removed, the threads continue to restrain the bundled fibers and thus prevent fibers of one bundle from becoming free to align and intermix with fibers of the other bundle. The thread coating is preferably releasable or only "tacky" so an installer can separate or peel the coated thread easily from the associated fiber bundle when terminating or splicing the bundled fibers.

Suitable materials for coating the binder threads 58, 60, include, e.g., certain glues, wax, atactic polypropylene, urethane acrylates, and oil-extended thermoplastic elastomers.

The adhesion material may be coated on the binder threads 58, 60, for example, by any one of the following processes:

1. Dip coating: The binder threads 58, 60 are dragged through a bath of the adhesion material. Excess material is then wiped off by one or more dies. If the material is water-based, the coated threads are passed through an oven to drive off the water. If the material is curable, the threads are exposed to heat or UV light to drive the cure.

2. Drizzle coating: The adhesion material is drizzled onto the threads, and excess material is wiped off with dies.

3. Die coating: The adhesion material is applied to the threads by a die using an extruder, a hot melt pump, or some other type of pump to feed the die.

After the binder threads 58, 60 are tied about the fiber bundles 54, 56, exposed portions of the coated adhesion material on the threads are treated to prevent the threads from adhering to any adjacent cable elements (e.g., strength elements 42 in FIG. 3) other than the bundled fibers themselves. This step ensures the binder threads 58, 60 will not be pulled loose or separated from the associated fiber bundles 54, 56 when the cable jacket 52 and any other cable elements in proximity to the threads 58, 60 are removed.

For example, after the binder threads 58, 60 are coated and tied to form the separate fiber bundles 54, 56, the bundles can be passed through an ultra fine, loose powdered material or talc so that the powder adheres to the exposed surfaces of the binder threads and prevents the threads from bonding to any cable elements other than the bundled fibers. The powder may comprise, for example, a fine grain water swellable, super absorbent powder (SAP) such as, e.g., FAVOR® absorbent polymer manufactured by Evonik, or "Aqua Keep" available from Sumitomo Seika Chemicals.

Super absorbent powders are derivatives of materials used in diapers, personal care, and hygiene products. The powders are typically based on lightly cross linked poly-acrylates, such as partially sodium-neutralized acrylic acid. Other lightly cross-linked polymers based on polyacrylamide, polyethylene oxide, and other hydrophilic monomers and their copolymers may be useful particularly for blocking water of high ionic strength. Further examples of superabsorbent powders that may be applied on the exposed binder threads 54, 56 to remove their adhesive quality, are set out in U.S. Pat. No. 4,867,526 (Sep. 19, 1989) all relevant portions of which are incorporated by reference.

In addition to preventing the adhesive coated binder threads 54, 56 from bonding to cable elements other than the associated fiber bundles when the cable jacket 52 is removed, it will be appreciated that the above SAP compounds can also act to block interstitial water migration inside the jacketed cable 50.

Other measures may also be taken to prevent the adhesive coated binder threads 58, 60 from bonding to adjacent cable elements. For example, once tied by the binder threads 58, 60, the fiber bundles 54, 56 may be passed through a tube or box with enough heat and/or air flow to eliminate any adhesive quality of the exposed surfaces of the threads 58, 60.

As shown in FIG. 5, the inventive binder threads 58, 60 serve to maintain the integrity of the fiber bundles 54, 56 after the cable jacket 52 and any surrounding cable elements are removed, and the bundles are exposed. The fibers of each bundle stay tied to one another and are restrained from aligning and commingling with the fibers of the other bundle. The time needed by an installer to terminate or splice the cable fibers as desired is substantially reduced.

Figure 6:
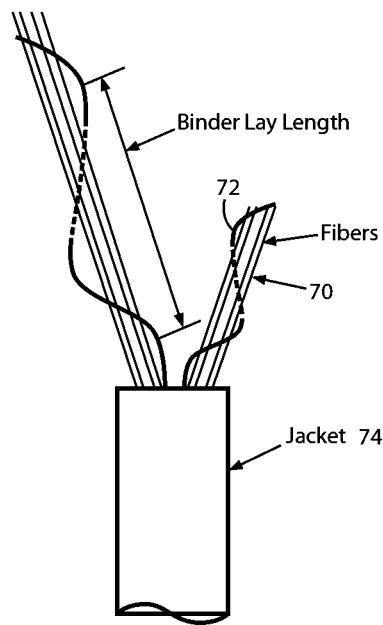
FIG. 6 illustrates two exposed fiber bundles wherein the bundles are tied by binder threads having different lay lengths.

Also, as shown in FIG. 6, if an exposed fiber bundle 70 is tied with a binder thread 72 according to the invention, and the thread is wound with a relatively short lay length, it is not necessary to strip an excessively long piece of the cable jacket 74 to maintain the integrity of the exposed bundle 70 when terminating or splicing the bundled fibers The amount of cable scrap produced over the course of a cable installation is therefore reduced.

While the foregoing represents preferred embodiments of the present invention, it will be understood by persons skilled in the art that various changes, modifications, and additions can be made without departing from the spirit and scope of the invention, and that the invention includes all such changes, modifications, and additions as are within the bounds of the following claims.

We claim:

1. A method of tying a group of optical fibers to one another to form an optical fiber bundle in a fiber optic cable having an outer jacket, comprising:
   providing a length of a binder thread;
   coating the binder thread with an adhesion material;
   tying the coated binder thread about a given group of optical fibers in a fiber optic cable having an outer jacket, thereby forming an associated optical fiber bundle;
   formulating the adhesion material so that (a) the coated binder thread bonds to the associated optical fiber bundle, and (b) the coated binder thread remains in place and bonded to the associated optical fiber bundle to restrain movement of the optical fibers about which the coated binder thread is tied when the optical fibers are exposed and the outer jacket of the fiber optic cable and other cable elements in proximity to the coated binder thread are removed: and
   treating portions of the coated binder thread that are exposed after tying the coated binder thread about the given group of optical fibers with a fine grained or powdered material, thus preventing the exposed portions of the coated binder thread from adhering to the outer jacket and other cable elements in proximity to the thread when the outer jacket is removed from the fiber optic cable.

2. The method of claim 1, wherein the coating step is performed by dip coating the binder thread in a bath of the adhesion material.

3. The method of claim 1, wherein the coating step is performed by drizzle coating the adhesion material onto the binder thread.

4. The method of claim 1, wherein the coating step is performed by applying the adhesion material to the binder thread by a die, and feeding the die using either an extruder or a pump.

5. The method of claim 1, wherein the treating step is performed by applying a super absorbent powder (SAP) on the exposed portions of the coated binder thread, thereby blocking interstitial water migration inside the jacketed fiber optic cable.

6. A fiber optic cable, comprising:
   an outer jacket;
   two or more bundles of optical fibers surrounded by the outer jacket;
   wherein each bundle includes a group of optical fibers, and a length of a binder thread tied about the fibers to form the bundle;
   an adhesion material is coated on each length of the binder thread;
   the adhesion material is formulated so that (a) each coated length of the binder thread bonds to the group of optical fibers about which the thread is tied to form an associated optical fiber bundle, and (b) each coated binder thread remains in place and bonded to its associated optical fiber bundle to restrain optical fibers of the bundle from moving to align and commingle among fibers of another optical fiber bundle when the associated optical fiber bundle is exposed and the outer jacket and cable elements in proximity to the coated binder thread are removed; and
   portions of each coated binder thread that are exposed after the thread is tied about its associated optical fiber bundle are treated with a fine grained or powdered material so that the exposed portions of the thread are prevented from adhering to other cable elements in proximity to the thread when the outer jacket is removed from the cable.

7. An optical cable according to claim 6, wherein the binder thread is formed of a material selected from among polyester, polyaramid, polypropylene, polyethylene, polyvinyl alcohol, liquid crystal polymers, and nylon.

8. An optical cable according to claim 6, wherein the binder thread is a polyester filament with a yield of from about 410 dTex to about 1650 dTex.

9. An optical cable according to claim 6, wherein the adhesion material is selected from among glues, wax, atactic polypropylene, urethane acrylates, and oil extended thermoplastic elastomers.

10. An optical cable according to claim 6, wherein the fine grained or powdered material comprises a super absorbent powder (SAP) for blocking interstitial water migration inside the jacketed fiber optic cable.

* * * * *